Jan. 6. 1925.
D. RONCONI
1,522,207
SELF SEATING ROTARY VALVE
Filed Aug. 19, 1921   3 Sheets-Sheet 1
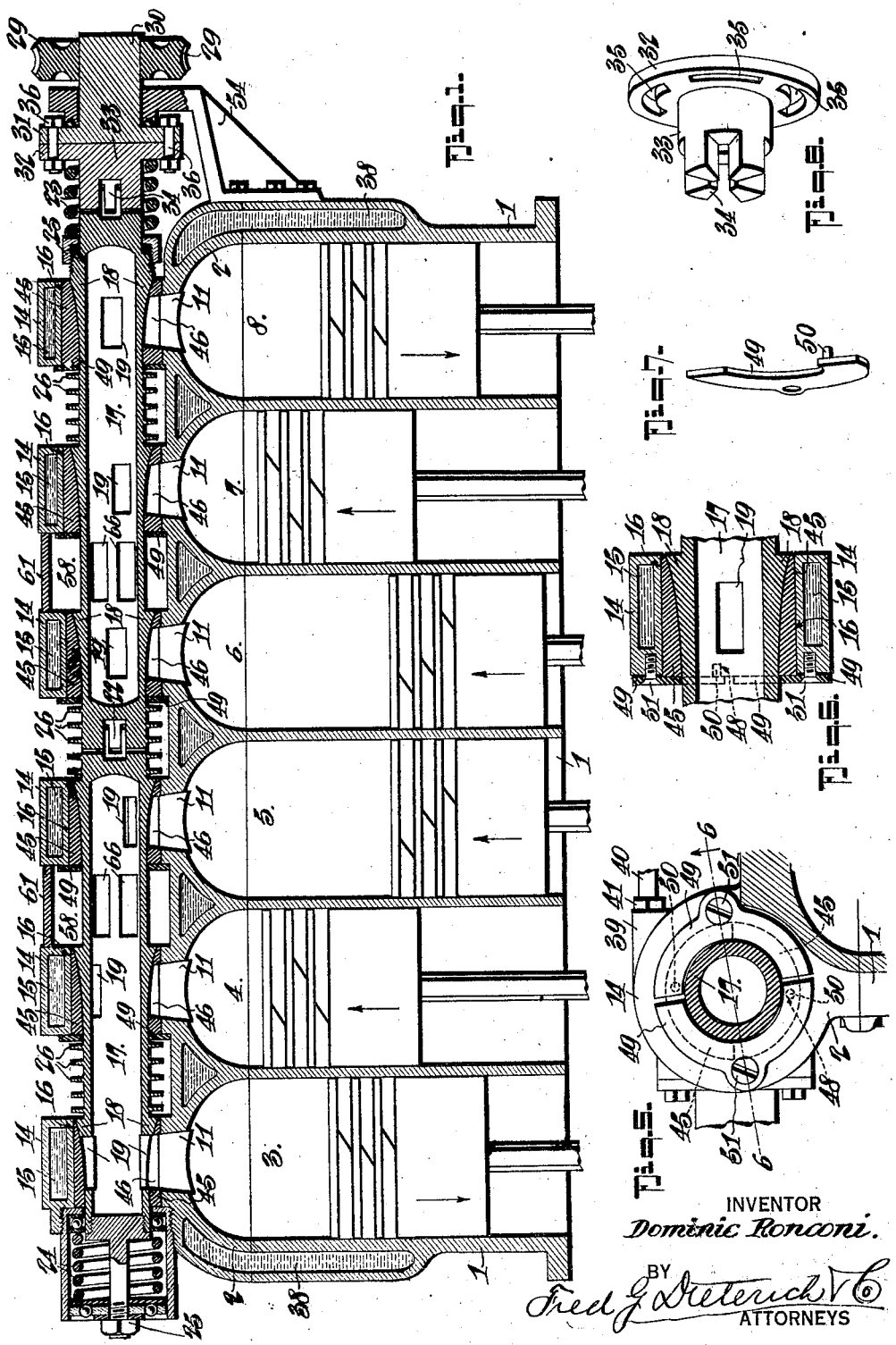
INVENTOR
*Dominic Ronconi.*
BY
*Fred G. Dieterich & Co.*
ATTORNEYS

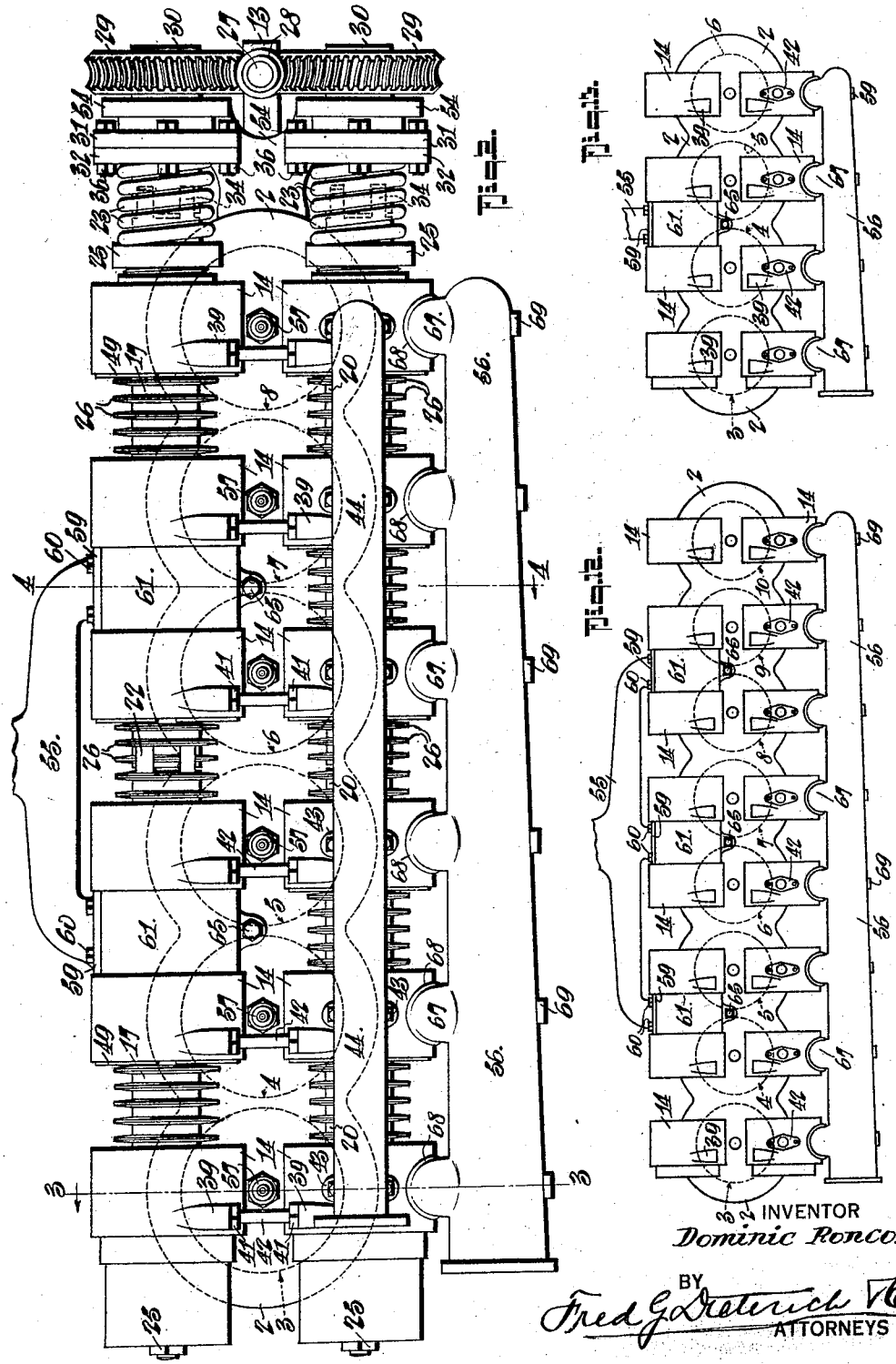

Jan. 6, 1925.
D. RONCONI
1,522,207
SELF SEATING ROTARY VALVE
Filed Aug. 19, 1921    3 Sheets-Sheet 3
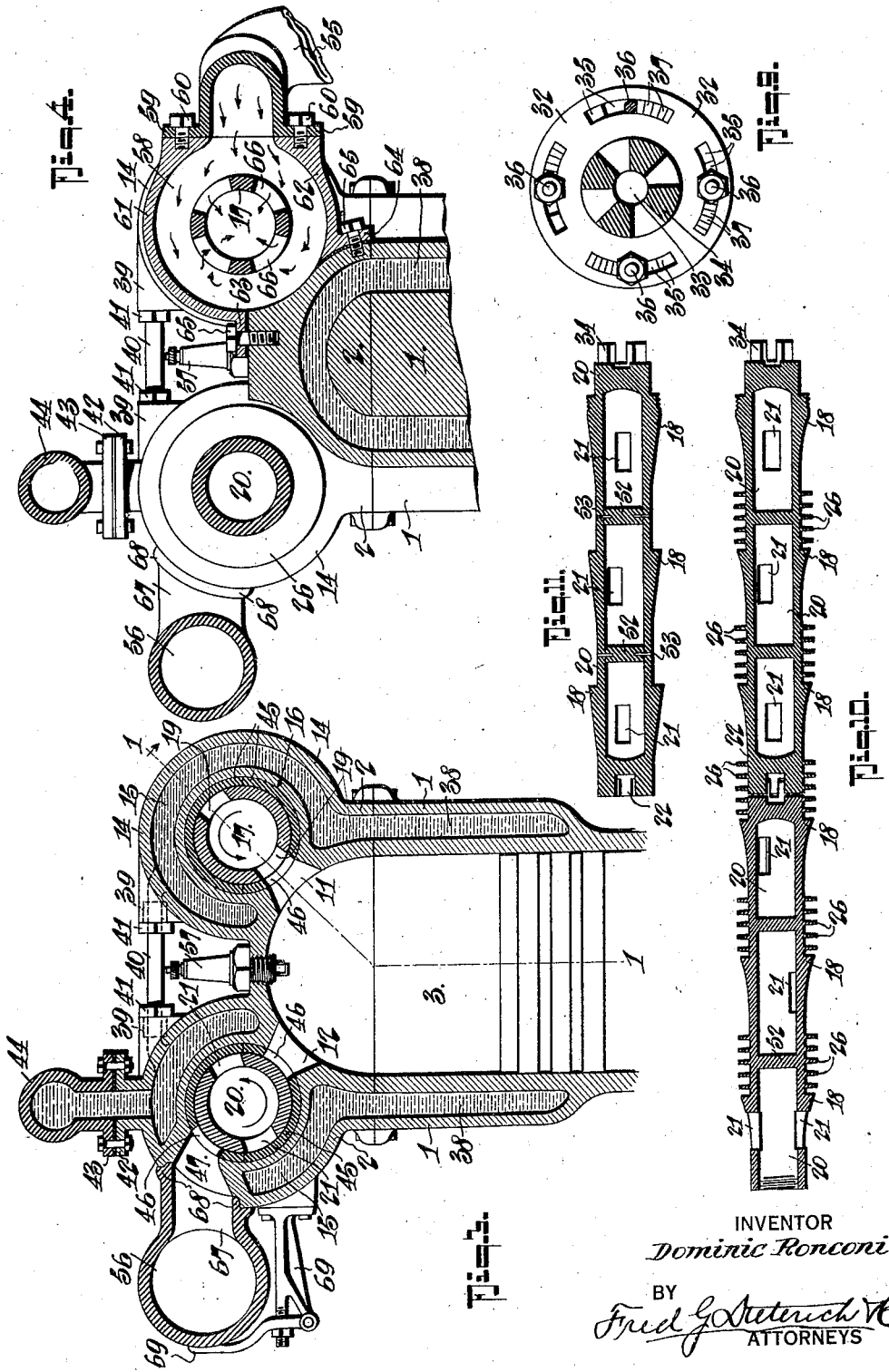
INVENTOR
Dominic Ronconi.
BY
Fred G. Stetevich
ATTORNEYS Patented Jan. 6, 1925.

1,522,207

UNITED STATES PATENT OFFICE.

DOMINIC RONCONI, OF CHICAGO, ILLINOIS.

SELF-SEATING ROTARY VALVE.

Application filed August 19, 1921. Serial No. 493,769.

*To all whom it may concern:*

Be it known that I, DOMINIC RONCONI, a citizen of the United States, residing at Chicago, in the county of Cook and State of Illinois, have invented certain new and useful Improvements in Self-Seating Rotary Valves, of which the following is a specification.

My present invention, which generally has reference to rotary valves for internal combustion engines, more specifically seeks to provide certain new and useful improvements in that type of self-seating rotary valve mechanisms disclosed in my Patents No. 1,241,663 dated October 2, 1917, and No. 1,382,857, dated June 28, 1921.

In my patented rotary valve structures, the valve is hollow and composed of a series of cone shaped seating portions and the said cone shaped or tapered portions are held to their seats under tension exerted thereagainst, in the direction of the longitudinal axis thereof, whereby the valve is adjusted to operate as a continuously self-seating one.

My present invention, which involves the main features of the valve structure disclosed in my patents aforesaid, primarily has for its purpose to provide certain new and useful improvements on my patented self-seating rotary valve mechanisms, particularly designed for making the valve mechanisms more compact and of lighter construction, without affecting the stability and efficiency thereof, and which will make the valve especially desirable for use in connection with automobiles and aeroplanes.

Another object of my invention is to provide certain improvements in the seating construction of my patented rotary valve which tend to cause the operating parts to remain tight indefinitely and to so cooperatively join the said parts that their period of opening and closing the engine ports is not materially affected by wear and in which the wear makes no appreciable difference in the bearing clearance of the working parts, thereby providing a valve structure of the kind stated that remains, through its life, substantially noiseless.

Another object of my present invention is to provide improved bearings for the seating portions of the valve members whereby the valve members and their cooperative seat bearing portions may be easily and quickly inserted into the bearing housings and be there positively held against lateral displacement by rotation, so that the ports from the cylinders of the valve members are positively maintained in proper relation.

Another object of my present invention is to provide a simple and effective means for quickly re-seating the valve members to their proper adjustment should it be possible that they become retarded or "late" in action.

A still further object of this invention is to provide an improved water jacketing and other cooling means for the valve and the valve bearing housings and means whereby the said water jacket system has communication with the jacketing of the cylinders of the engine upon which the valve is mounted and whereby the possibility of air pockets forming in the tops of the said bearing housing water jacket is positively eliminated.

With the above and other advantages in view, my invention embodies those peculiar features of construction and novel arrangement of parts that will be first fully described, then specifically pointed out in the appended claims and illustrated in the accompanying drawings, in which:

Figure 1 is a vertical longitudinal section of a portion of a six cylinder internal combustion engine with my improved rotary valve structure embodied therewith, the said view being taken substantially on the line 1—1 of Figure 3.

Figure 2 is a top plan view of the same.

Figure 3 is a detail vertical cross section taken on the line 3—3 on Figure 2.

Figure 4 is a similar view taken through one of the intake chambers, as indicated by the line 4—4 on Figure 2.

Figure 5 is a detail vertical section that illustrates the manner of application of the half ring lock and adjusting members.

Figure 6 is a horizontal section thereof taken on the line 6—6 of Figure 5.

Figure 7 is a detail perspective view of one of the half ring locks and adjusting member.

Figure 8 is a detail perspective of one of the combined clutching and adjusting flange members.

Figure 9 is a face view, parts being in section, which illustrates the construction and cooperative relation of the adjusting flanges hereinafter mentioned.

Figure 10 is a longitudinal section of the exhaust valve.

Figure 11 is a similar view which shows a modified construction of the exhaust valve.

Figure 12 is a diagrammatic plan view of the cylinder head of the eight cylinder internal combustion engine constructed in accordance with my invention, the valve and other removable parts being omitted.

Figure 13 is a similar view of a four cylinder head.

In my former construction of rotary valve mechanism, as shown and described in my patents aforesaid, a central common intake bearing for the rotary valve is included. In my present construction of rotary valve mechanism, the hollow rotary valve is of substantially the same construction as in my patented form of rotary valve (intake and exhaust) excepting such detailed features thereof as are hereinafter specifically set forth. In my present valve structure, the rotary valve members are free of the common central intake bearing and the central exhaust bearing and by the elimination of such parts, is effected reduction of friction and less weight, as well as causing the operating parts to do better work, since my improved valve, having less resistance, will respond more actively and accurately to its running adjustments and it also serves to produce better facilities for distributing the working mixture through the intake valve to the working chamber and exhausting the same to the exhaust manifold, as will hereinafter appear.

In the drawings, in which like numerals of reference indicate like parts in all of the figures, I have illustrated my invention principally as applied to a six cylinder internal combustion engine in which the cylinder base structure is substantially similar to any standard type of such engine now in use and the same is generally indicated by the numeral 1.

Mounted upon and suitably joined to the said base structure is the cylinder head 2, which head, and the mechanism cooperatively mounted thereon, forms the subject matter of my present invention.

The cylinder head member 2 and the said base structure 1, when cooperatively joined, form between them cylinder ports or chambers designated 3, 4, 5, 6, 7 and 8 (see Figure 1) each of which has an intake port 11 and an exhaust port 12 adapted to communicate, at predetermined intervals, with the intake manifold 55 and the exhaust manifold 56 through mechanism presently to be described.

The said cylinder head also includes a plurality (two for each cylinder) of valve bearing housing members 14, each cast en bloc with the cylinder head and water jacketed as at 15 and also cylindrically bored as at 16. The said bores 16 have their axes parallel to the axis of the engine crank shaft 13 and each successive bore 16 from the one farthest from the driven valve member to the opposite end thereof is bored slightly larger than the preceding one to provide for the ready sliding of the valve member and its bearing portions longitudinally thereinto, thus doing away with the necessity of a two-part housing, as shown in my patented construction before mentioned.

As illustrated in the drawings, my improved valve members, while quite similar to those illustrated in my aforesaid patents, are in the nature of hollow cylinders, and by reference to Figures 2, 4, 10 and 11, many advantageous improvements of my present valve structure will be apparent. In my said improved construction, the intake valve member 17 is in the nature of a hollow cylinder having seating portions 18, which are cone shaped as in my patented construction, but I prefer that they be turned on a "Schiele" curve to form a more perfect seat. The tractrix or Schiele's anti-friction curve is the evolute of the catenary. It has been found that, in practice, a straight perfect cone seat, will, when used long and hard, wear to substantially the curve shown in the drawings, and from this it will be apparent that the valve when constructed a perfect cone will become more efficient and practical with constant wear, than as manufactured. However, since the effectiveness and efficiency of the "Schiele" curve has been discovered, I prefer to build the valve in this manner originally. Each seating portion of the valve 17 is provided with a pair of intake ports 19 adapted, at predetermined intervals, to open communication between the engine port 11 and the intake manifold 55.

The exhaust valve 20 has also seating portions 18 and ports 21 adapted, at predetermined intervals, to open communication between the exhaust port 12 and the exhaust manifold 56.

The exhaust valve in my present construction has partition members, in the nature of flanges 52, whose purpose is to keep each cylinder free from back pressure and the said flanges 52 may be formed integral with the valve stem or body 20, as shown in Figure 10, or fastened thereto by pins 53, as shown in Figure 11.

The valve members when applied to a two or four cylinder engine may be constructed substantially the same as in my patented structure, that is,—a one-piece valve member with spring tension applied to the forward end to tightly hold the said valve member to its operative position and still allow for considerable expansion and contraction, but when applied to a six cylinder or eight cylinder head, such tension and valve structure might be found insufficient to the greatest test of efficiency and, therefore, I construct my valve members and mount the same as illustrated in Figures 1, 2, 3, 4 and 10, by reference to which it will be seen that each valve member is formed of a number of units (two being shown) connected in longitudinal alignment by clutch devices 22 and in such manner as to cause positive rotation without lost motion and still allow for longitudinal independency of the valve sections, as far as tension and seating is concerned.

The intake and exhaust valves each have tension devices 23 at the driven end and like devices 24 at the far end so that there will be a pulling tendency exerted on one-half of the valves by the other devices 23. All of the spring devices have means 25 for adjusting their tension to a nicety so as to properly hold the valve to its seat.

If it is found desirable, the valve members, whether mounted on a water or air cooled engine, may be equipped with cooling fins 26, as shown, and the said fins may be either straight, as shown, or wound helically about the hollow valve.

The valves equipped with diametrically opposite ports 19 and 21 may be rotated in the direction of the arrow on Figure 3, and when so constructed and driven, the valves would be caused to rotate once to every four revolutions of the crank shaft 13 through the medium of suitable gear connection of that shaft with a vertical shaft 27 and the worm 28 mounted on the upper end thereof and adapted to bring the worm wheels 29—29 that are fixedly mounted upon to turn with stub shafts 30—30 which carry bearing flanges 31—31 that abut and co-operate with like adjusting flanges 32—32 formed on the stub shafts 33—33 having clutch connections 34—34 with the rotary valves 17 and 20. The flanges 31—32 have elongated slots 35 which slots register with one another and through which are inserted clamping bolts 36 all for the purpose of the ready adjustment, to proper turning, of the valve members.

From the foregoing, it will be readily seen that the timing of the valves may be conveniently and positively provided, it being understood that should the valve actions become retarded or "late" on account of the wear of gears, or the setting of the couplings, it is very easy to put the engine on the "dead" center, and by then loosening up on the bolts 36—36 through the disks 31—31 the valve may be quickly adjusted to its position and by then inserting wedge blocks 37 (see Figure 9) behind the said bolts 36 and tightening the latter, the valve will be held to its properly adjusted position.

As before mentioned, the housings 14 are provided with water jackets 15 and the said water jackets are in communication with the water jackets 38 of the base structure 1, as shown. As the housings 14 are at the highest part of the cylinder head 2, such housings must be provided with air vents to prevent the air pockets from forming in the higher portions thereof. For such purpose, the tops of the housings 14 are provided with sockets 39 that communicate with the water spaces 15 and are adapted to receive cross over pipes or laterals 40 connected in the said sockets 39, as at 41, for the purpose of forming air and water passages from the housings over the intake valves to the housing over the exhaust valves, the said latter housings being provided with flanged openings 42 adapted to be connected to like flanges 43 on the top manifold 44 of the water circulating system (see Figures 2 and 3).

By connecting the water jackets of the opposing housing 14, in the manner shown and described, provision is made for the escape of air from their water jackets as they are filled to their highest limit.

In my patented construction of rotary valve, as hereinbefore mentioned, the bearing members or bushings were either wholly or partially tapered and otherwise of a more complicated nature than the more simple and economical construction shown herein. In my present construction, the valve bearing members or bushings are perfectly cylindrical on their external peripheries and are turned down to fit perfectly the successively graduated bore 16 in the housing members, as hereinbefore stated, and each bushing 45 has a bore to snugly fit and form a bearing seat for the seat portions 18 of the valve, as shown, and each bushing member for the intake valve has a single communicating port 46 adapted to register with the intake port 19; the bushings for the exhaust valve are each provided with a pair of such ports 46, one to register with the exhaust valve and the other to register with the openings 47 in the housing and leading to the exhaust manifold 56.

The bushings 45 are formed of two half sections each of which is provided with a socket 48 and the said bushings are held to their proper positions within the housings 14, after they have been inserted thereinto with the valve members 17 and 20, by half ring lock and adjusting members 49 of which two are provided for the far side of each housing 14. The said lock members 49 are each provided with a locking pin 50, which, when the adjusting screw 51 is tightly screwed home to force the bushing member to its proper position and to hold the same there, fit into the sockets 48 in the said bushing members and thereby hold the said bushing members positively against displacement, by rotation, (see Figures 5, 6 and 7.)

In order to provide a suitable abutment for the tension device 23, a bearing bracket 54 is provided against which the flanges 31 on the stub shaft 30 bear while rotating and thereby imparting their motion to the valves 17 and 20 through the clutch 34 (see Figures 1 and 2).

As hereinbefore stated, the working mixture intake mechanism in my patented structures was in the nature of a central bearing portion common to the whole valve mechanism and which contributed its portion of weight, friction and insufficiency as a whole. In my present construction, the central bearing common to the valve is eliminated both on the intake and exhaust side. In my present construction, the working mixture is inducted through an ordinary type of intake manifold 55 and after passing through the intake chamber, hereinafter specifically described, passes, at the proper time, regulated by the intake valve ports, into the working cylinder where, after proper compression, the said mixture is ignited by the usual spark plug 57 that is inserted through the threaded aperture provided therefor in the cylinder head.

After the working mixture has been exploded, it is exhausted at the proper time, regulated by the ports of the exhaust valve, into the exhaust manifold 56. In accordance with the number of engine cylinders, I provide one or more intake chambers 58. In engines of four or less cylinders, one intake chamber may be used in the center of the engine, but for a larger engine, having a greater number of working cylinders, I prefer to provide a plurality of such chambers, as shown, and which may be regulated as in Figures 2, 12 and 13, in which are illustrated six, eight and four cylinder engines respectively; those for the "six" being placed between cylinders two and three and between cylinders four and five (see Figure 2); those for the "eight" being placed between cylinders two and three and four and five and between six and seven (see Figure 12) while in the "four," a single chamber is sufficient and it is preferably placed as shown in Figure 13.

The intake manifold has its flange 59 connected to the chambers 58, as at 60, and the chambers 58, which are formed around the valve 17 at proper points by casing sections 61—62 have flanges 63—64 which are tightly connected to the cylinder head member 2, as at 65, and the said several casing sections are so constructed that they, together with the curvature of the cylinder head at that point, form perfect cylindrical chambers 58 surrounding but not engaging the valve member 17, the latter having constant communication with the said chamber by a plurality of openings 66 therein, as clearly shown in Figure 4.

The exhaust manifold 56 is common to all the cylinders and has communication therewith through laterals 67 which have seating rings 68 provided thereon to engage seats therefor in the openings 47 in the housing 14 and the said seat portions are tightly held in engagement with their seats by any suitable clamping means (see for example 69).

My improved valve mechanism makes it possible, due to lightness of weight, compact connection of the operative parts and positive valve action,—the valve motion being relatively continuous with no engaging or disengaging parts,—to produce an engine which is suitable for all types of light vehicles, as well as adapted for aeroplanes and the like, since there can be no perceptible noise other than occasioned by faulty adjustment of the gear connections that transmit the motions from the crank shaft.

While the detailed showing of the parts illustrate a practical representation of my improved construction of rotary valve mechanism, it is to be understood that in the development of my invention, the details may be varied and somewhat modified to suit the particular type of vehicles to which an engine, with my improved valve mechanism embodied therein, is to be applied, without departing from my invention as defined in the appended claims.

From the foregoing description, taken in connection with the accompanying drawings, the complete construction, the manner of operation and the advantages of my present form of rotary valve mechanism for internal combustion engines will be readily apparent to those familiar with the structure and the practical use of engines for mechanism of the type mentioned.

What I claim is:

1. In an internal combustion engine of that type having rotary intake and exhaust valves and a plurality of working cylinders; housing bearings cast en bloc with the cylinders' head, one for each intake and exhaust in the cylinders, a valve having tapered bearing portions rotatably mounted within the said housing bearings all such tapers being directed in the same direction, the said housing bearings each having a cylindrical bore, a cylindrical bushing having a tapered bore for each opposing valve bearing portion and housing bearings and engaging the opposing bearings, and means for holding the bushings seated in a relatively fixed relation with respect to the valve and bushing bearing surfaces.

2. In an internal combustion engine of that type having rotary intake and exhaust valves and a plurality of working cylinders; housing bearings cast en bloc with the cylinder head, one for each inlet and exhaust side of said cylinders and each including water jacketing communicable with the water jacketing of the engine body, a valve having tapered bearing portions of like diameters rotatably mounted within the said housing bearings, the said housing bearings each having a cylindrical bore which said bores successively decrease in diameter, a two-part bearing bushing for each housing, each said bushing successively decreasing in diameter and each including a tapered bore of like diameter, and means for holding the bushings to position.

3. In an internal combustion engine of that type having rotary intake and exhaust valves and a plurality of working cylinders; housing bearings on the cylinders' head, one for each inlet and exhaust side of said cylinders, a valve having tapered bearing portions rotatably mounted within the said housing bearings, the said housing bearings each having a cylindrical bore, a tapered bushing for each cooperating valve bearing and housing bearings and engaging the opposing faces of the said bearings, and means for holding the bushings seated in a relatively fixed relation with respect to the valve and bushing bearing surfaces, the said means comprising opposing half locking rings fixedly attached to the housings and projected annularly about and in engagement with the head end of the bushing.

4. In an internal combustion engine of that type having rotary intake and exhaust valves and a plurality of working cylinders; housing bearings on the cylinders' head, a valve having tapered bearing portions rotatably mounted within the said housing bearings, the said housing bearings each having a cylindrical bore, a tapered bushing for each cooperating valve bearing and housing bearings and engaging the opposing bearing faces, means for holding the bushings seated in a relatively fixed relation with respect to the valve and bushing bearing surfaces, the said means comprising opposing half locking rings fixedly attached to the housings and projected annularly about and in engagement with the head end of the bushing, and means engaging the housing and lock ring for holding the bushings against rotation with the valve.

5. In an explosive engine of that type having rotary self-seating intake and exhaust valves and a plurality of working cylinders, a series of housing bearings, each of the said bearings having a cylindrical bore, a rotary valve having tapered bearings portions, one for each housing bearing, a tapered bushing cooperatively connected with each set of valve bearing portions and its corresponding housing bearing, means for holding the bushings up to their operative connection with the valve and housing bearing portions, the said means comprising semi-circular lock rings mountable over the outer end face of the bushings, and means for attaching the rings to the housing bearings and the bushings whereby to lock the latter from rotation with the valve.

6. In an internal combustion engine of the class described, an engine body including a head having a plurality of working cylinders, each having intake and exhaust ports at their exploding end, two sets of housing bearings over the exploding end of each cylinder, a rotary valve for each set of housing bearings for all of the cylinders and having ports for communicating with the ports in the cylinders, each housing having a cylindrical bore, the valves having tapered bearing portions located within each of their respective housing bearings, a bushing in position between each co-acting housing bearing and valve bearing, means for holding the bushings up to their adjusted positions between the valve and housing bearing and tension devices tending to normally project the valve in longitudinal direction whereby to constantly seat its bearing portions against the bushing, operative power transmission connections that join the valves and driven shaft sections of the engine, the said operative connections including a rim flange on the end of the valve and having a plurality of slotways and a like flange having registering slotways and located on the end of the adjacent driven shaft section of the engine, each said flange being adapted to oppose the other flange rim, and means insertable through the slotways of the two opposing flange rims for rotatably adjusting the valve connection with respect to the driven shaft section to provide for timing the controlling action of the valve.

7. In an internal combustion engine of the character stated and whose construction includes a plurality of working cylinders each having an inlet and an exhaust port in the exploding end thereof; a set of housing bearings aligned with each side of the exploding ends of the said cylinders, hollow rotary intake and exhaust valves each having ports for cooperating with their coincident ports of the several cylinders, an intake manifold cooperative with the intake valve, the said valves having tapering bearing portions along their length for each housing bearing, each housing bearing having a circular bore, a housing cooperative with each co-acting valve bearing portion and housing bearing, the several cylindrical bearing portions of the housing being of successively decreasing diameter from the driving end of the valve to the other end thereof whereby the valves can be inserted in the direction of its length into operative condition within the respective sets of housings, a tension device for each valve tending to normally project the valves in the direction of their length to maintain a solid seat attachment relatively to the bushing bearings and the engine cylinders.

8. In an internal combustion engine of that type having rotary intake and exhaust valves and a plurality of working cylinders with which the valves cooperate, a pair of oppositely disposed housing bearings for each cylinder positioned for cooperating with the intake and exhaust ports thereof, the said housings being connected with the head for the cylinders, each housing having a cylindrical bore, the diameters of the bores of the several sets of housings successively increasing from that end of the cylinders' head into which the valve is inserted in the direction of its length, each valve having individual tapered bearing portions of uniform shape that fit and turn within the bores of their respective series of housings, a tapered bushing fitting between the opposing bearing faces of the housings and their respective tapered bearings on the valves, tension means, and operative connections joining the said means with the valves whereby to constantly seat the bearing portions of the valves on their respective bushings, and means for coupling the valves with rotative elements of the engine for imparting rotation thereto.

9. In an internal combustion engine of that type having rotary intake and exhaust valves and a plurality of working cylinders with which the valves cooperate, a pair of oppositely disposed housing bearings for each cylinder positioned for cooperating with the intake and exhaust ports thereof, the said housings being connected with the head for the cylinders, each housing having a cylindrical bore, the diameters of the bores of the several sets of housings successively increasing from that end of the cylinders' head into which the valve is inserted in the direction of its length, each valve having individual tapered bearing portions of uniform shape that fit and turn within the bores of their respective series of housings, a tapered bushing fitting between the opposing bearing faces of the housings and their respective tapered bearings on the valves, tension means, operative connections joining the said means with the valves whereby to constantly seat the bearing portions of the valves on their respective bushings, means for coupling the valves with rotative elements of the engine for imparting rotation thereto, said means including a longitudinally shiftable clutch connection that joins the valve with the said rotative engine elements.

10. In an internal combustion engine of that type having rotary intake and exhaust valves and a plurality of working cylinders with which the valves cooperate, a pair of oppositely disposed housing bearings for each cylinder positioned for cooperating with the intake and exhaust ports thereof, the said housings being connected with the head for the cylinders, each housing having a cylindrical bore, the diameters of the bores of the several sets of housings successively increasing from that end of the cylinders' head into which the valve is inserted in the direction of its length, each valve having individual tapered bearing portions of uniform shape that fit and turn within the bores of their respective series of housings, a tapered bushing fitting between the opposing bearing faces of the housings and their respective tapered bearings on the valves, tension means, operative connections joining the said means with the valves whereby to constantly seat the bearing portions of the valves on their respective bushings, means for coupling the valves with rotative elements of the engine for imparting rotation thereto, said means including a longitudinally shiftable clutch connection that joins the valves with the said rotative engine elements, and further means for rotatively adjusting the clutch connections relatively to the rotative engine element whereby to seat the valve with respect to its ports and its engine cylinder ports.

11. In an internal combustion engine of that type having rotary intake and exhaust valves and a plurality of working cylinders with which the valves cooperate, a pair of oppositely disposed housing bearings for each cylinder positioned for cooperating with the intake and exhaust ports thereof, the said housings being connected with the head for the cylinders, each housing having a cylindrical bore, the diameters of the bores of the several sets of housings successively increasing from that end of the cylinders' head into which the valve is inserted in the direction of its length, each valve having individual tapered bearing portions of uniform shape that fit and turn within the bores of their respective series of housings, a tapered bushing fitting between the opposing bearing faces of the housings and their respective tapered bearings on the valves, tension means, operative connections joining the said means with the valves whereby to constantly seat the bearing portions of the valves on their respective bushings, means for coupling the valves with rotative elements of the engine for imparting rotation thereto, said means including a longitudinally shiftable clutch connection that joins the valve with the said rotative engine element, further means for rotatively adjusting the clutch connections relatively to the rotative engine element whereby to seat the valve with respect to its ports and its engine cylinder ports, the said further means including a pair of opposing rim flanges, one of which has concentric slots and the other adjusting bolts that pass through the said flange rim slots, and devices for clamping the said bolts for holding the valve at the set positions relatively to the valve and engine cylinders' ports.

12. In an engine of the character described, a body having a plurality of working cylinders arranged in longitudinal alignment, each cylinder having an intake and an exhaust port in the explosion end thereof, a pair of independent cylindrical housings on the cylinder head for each cylinder, the series of housings constituting a line of bearings at each side of the working cylinders of the engine, a rotary valve adapted for being projected in the direction of its length into each side set of housings, the valves and the housing having coengaging tapering bearing portions, the valves having ports for controlling the intake and exhaust ports in the working cylinders, the said valves being each composed of two units, each independently movable in the direction of its length, the two units having connections whereby they are caused to rotate together, and an independent tension device for each section of the valve for holding the valve sections up to their bearing sides, as set forth.

13. In an engine of the character described, the combination with a plurality of independent working cylinders in longitudinal alignment, each having a port in the receiving end thereof, a housing over the port of each cylinder, each housing having an internal tapering seat, a hollow valve mounted to rotate in the tapering seats of the housings, said valve having annular tapering bearing portions for engaging the said housing seats, the valve being composed of two units in longitudinal alignment and whose adjacent ends have interengaging clutch members constructed to permit independent longitudinal flexure of each valve unit, a tension device cooperating with one valve unit that tends to pull its valve unit to its bearing seat, and a tension device that cooperates with the other valve unit which tends to push its unit to its bearing seat.

14. In an engine of the character described, the combination with a plurality of independent working cylinders in longitudinal alignment, each having a port in the receiving end thereof, a housing over the port of each cylinder, each housing having an internal tapering seat, a hollow valve mounted to rotate in the tapering seats of the housings, said valve having annular tapering bearing portions for engaging the said housing seats, the valve being composed of two units in longitudinal alignment and whose adjacent ends have interengaging clutch members constructed to permit independent longitudinal flexure of each valve unit, a tension device cooperating with one valve unit that tends to pull its valve unit to its bearing seat, a tension device that cooperates with the other valve unit which tends to push its unit to its bearing seat, each of the tension devices including an independent means for adjusting the tension of said devices.

15. In an engine of the character described, the combination with a plurality of independent working cylinders in longitudinal alignment, each having a port in the receiving end thereof, a housing over the port in each cylinder, each housing having an internal tapering seat, a hollow valve mounted to rotate in the tapering seats of the housings, said valve having annular tapering bearing portions for engaging the said housing seats, the valve being composed of two units in longitudinal alignment and whose adjacent ends have interengaging clutch members constructed to permit independent longitudinal flexure of each shaft unit, a tension device cooperating with one shaft unit that tends to pull its shaft unit to its bearing seat, a tension device that cooperates with the other shaft unit which tends to push its unit to its bearing seat, a power transmission stub shaft, and a longitudinally shiftable clutch connection that joins the power transmission stub shaft and the adjacent shaft unit end.

16. An internal combustion engine of the character described, the combination with a plurality of working cylinders, a rotary intake controlling valve, and a rotary exhaust controlling valve, the said valves cooperatively connecting with their respective intake and exhaust sides of all of the cylinders, a housing on each intake side and a housing on each exhaust side of the cylinder, the housings having internal bearings for receiving their respective intake and exhaust control valves, each housing having a substantially annular water jacket in connection with the engine cooling jacket, each opposite pair of housings having a vent pipe connection and a water inlet manifold connected to one of the housing jackets of each pair of jackets, the aforesaid vent pipe communicating with said water manifold whereby to provide for the escape of any air that tends to collect in the housing jacket during the water filling operation.

DOMINIC RONCONI.